United States Patent [19]

Schmidt

[11] 4,082,112
[45] Apr. 4, 1978

[54] HOSE COUPLING

[75] Inventor: Manfred Schmidt, Munich, Germany

[73] Assignee: AGFA-Gevaert, A.G., Leverkusen, Germany

[21] Appl. No.: 713,450

[22] Filed: Aug. 11, 1976

[30] Foreign Application Priority Data

Aug. 22, 1975 Germany .................................. 2537407

[51] Int. Cl.² ............................................. F16K 37/28
[52] U.S. Cl. ............................ 137/614.03; 137/614.04
[58] Field of Search ....................... 137/614.03, 614.04; 285/360

[56] References Cited

U.S. PATENT DOCUMENTS

| 1,899,119 | 2/1933 | Singer | 285/360 X |
| 2,108,714 | 2/1938 | Hirsch et al. | 137/614.04 |
| 2,864,628 | 12/1958 | Edleson | 137/614.04 |
| 3,196,897 | 7/1965 | Hodson | 137/614.04 X |
| 3,435,848 | 4/1969 | Johnston | 137/614.04 |

FOREIGN PATENT DOCUMENTS

| 1,360,204 | 3/1964 | France | 137/614.03 |
| 1,202,678 | 1/1960 | France | 137/614.04 |
| 663,132 | 4/1929 | France | 137/614.04 |
| 585,087 | 11/1958 | Italy | 137/614.03 |

Primary Examiner—Alan Cohan
Assistant Examiner—Gerald A. Michalsky
Attorney, Agent, or Firm—Peter K. Kontler

[57] ABSTRACT

A hose coupling wherein the ends of two hoses are connected to tubular valve bodies having axially extending passages with annular valve seats which face the respective hoses and are normally engaged by disk-shaped elastic valve elements under the action of helical valve springs. A tubular member is reciprocably installed in one valve body at the open end of the respective passage and has a centrally located collar which is flanked by elastic sealing rings. When the two bodies are coupled to each other by a bayonet lock, one end of the tubular member lifts the valve element in the other body off the respective seat and the other end of the tubular member then lifts the valve element in the one body off the respective seat under the action of the valve spring in the other body. When the two bodies are disconnected from each other, the valve spring in the one body engages the respective valve element with the adjacent seat and shifts the tubular member with respect to the one body. The ring at one side of the collar seals the passage of the one body from the atmosphere in all positions of the tubular member, and the ring at the other side of the collar seals the passage of the other body from the atmosphere during and subsequent to coupling of the two bodies to each other.

12 Claims, 1 Drawing Figure

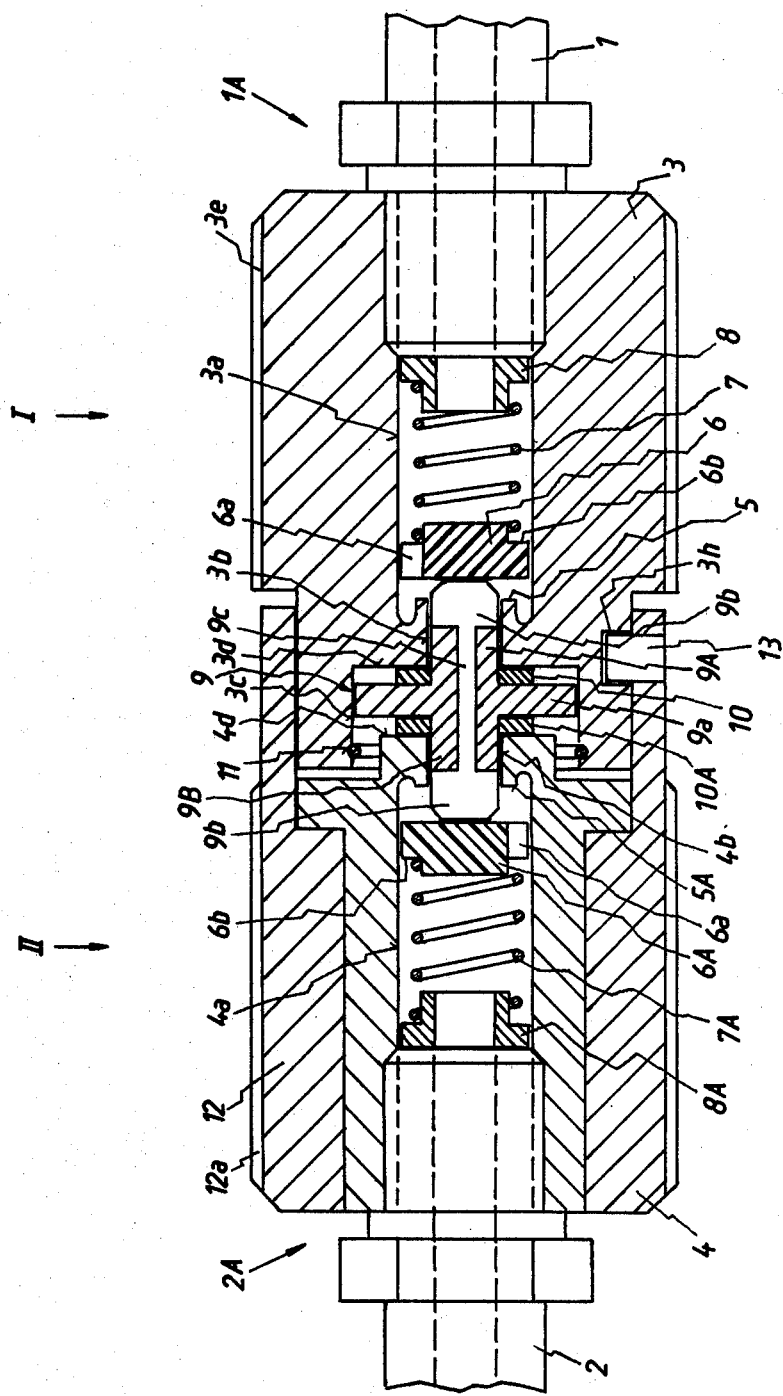

HOSE COUPLING

BACKGROUND OF THE INVENTION

The present invention relates to connectors for conduits, and more particularly to improvements in connectors of the type wherein two discrete valves assume closed or sealing positions to prevent a fluid from flowing into or from the conduits in automatic response to separation of the conduits from each other. One or more connectors which embody the present invention can be used with advantage in conduits which connect the interelectrode gas gap of an ionography imaging chamber in X-ray apparatus with one or more sources of gaseous media, e.g., with sources of high Z gases. Imaging chambers and X-ray apparatus of the type which can utilize the improved connector or connectors are disclosed in the commonly owned copending application Ser. No. 720,577 entitled "Ionography Imaging Chamber" filed Sept. 7, 1976 by Jürgen Müller et al. The interelectrode gas ga of an ionography imaging chamber must be maintained at an elevated pressure (e.g., 6–20 atmospheres) during imaging of an object onto an insulating receiver medium, and the gap is filled with a high Z gas (normally Xenon or krypton) which must be evacuated from the gap prior to withdrawal of a freshly exposed receiver medium. The noble gas is expensive and, therefore, the conduits for such gas must be sealed from the atmosphere not only when they connect the gap with a source of noble gas but also when the customary couplings in such conduits must be disengaged for any one of a variety of reasons. The presently known connectors or couplings in such conduits are not sufficiently reliable, i.e., leakage of expensive gases is quite pronounced not only when the couplings are engaged but also when the connection between the conduits, which are normally coupled to each other, is terminated or interrupted.

SUMMARY OF THE INVENTION

An object of the invention is to provide a novel and improved connector for conduits, especially a quick-disconnect coupling for flexible hoses, which prevents leakage of confined fluid or fluids into the atmosphere or vice versa not only when the conduits are connected to each other but also during and subsequent to disengagement of the coupling.

Another object of the invention is to provide a quick-disconnect hose coupling which can prevent leakage regardless of the pressure of the confined fluid which may be a gaseous or a liquid medium.

A further object of the invention is to provide the coupling with novel and improved means for effecting automatic sealing of internal spaces of separated conduits from the atmosphere and for insuring that the internal spaces of the conduits remain sealed from the atmosphere in the course of coupling of such conduits to each other.

An additional object of the invention is to provide novel and improved tubular valves for use in the above-outlined coupling.

An ancillary object of the invention is to provide a quick-disconnect coupling which can be installed in existing conduits (especially flexible hoses) as a superior substitute for existing couplings.

Another object of the invention is to provide a simple, compact and relatively inexpensive leakproof quick-disconnect coupling which confines the fluid or fluids in the interior of the conduits with an unchanging degree of reliability regardless of the frequency at which the conduits are attached to or separated from each other.

The invention is embodied in a connector for conduits, particularly in a quick-disconnect coupling for hoses which convey fluids (e.g., noble gases) at elevated pressures. The connector comprises two tubular valves having first and second valve housings or bodies each of which is connected to a different conduit and each of which has an open-ended passage in communication with the interior of the respective conduit, a preferably annular seat surrounding an intermediate portion of the respective passage and facing toward the respective conduit, a preferably elastic valve element in the passage, and a helical spring or other suitable biasing means for urging the valve element against the respective seat. The connector further comprises a tubular member which is installed in the housing of the first valve, which has first and second actuating portions, and which is movable in the housing of the first valve between a first position in which the first actuating portion disengages the valve element of the first valve from the respective seat so that a fluid can flow between the interior of the tubular member and the interior of the conduit which is connected to the housing of the first valve, and a second position in which the biasing means of the first valve is free to maintain the respective valve element in sealing engagement with the adjacent seat. The connector still further comprises a bayonet lock or other suitable means for separably attaching the two housings to each other in such positions that the second actuating portion of the tubular member extends into the open end of the passage of the housing of the second valve and disengages the respective valve element from its seat whereby the biasing means of the second valve maintains the tubular member in the first position through the medium of the valve element of the second valve. When the two housings are separated from each other, the biasing means of the first valve moves the respective valve element into engagement with the adjacent seat whereby such valve element moves the tubular member to the second position. The valve elements are located between the adjacent valve seats and the respective conduits and the springs of the biasing means react against internal shoulders or retainers of the respective housings to bias the valve elements toward the adjacent seats.

The housings of the first and second valves are preferably formed with first and second end faces which flank a median portion (preferably a collar) of the tubular member when the two housings are attached to each other. The connector preferably further comprises sealing means which is interposed between the collar and at least one end face to prevent escape of fluid from one or both passages during attachment and/or separation of the housings from each other. Such sealing means preferably comprises readily compressible elastic rings which flank the collar of the tubular member and engage the respective end faces in assembled condition of the connector. The extent to which the sealing ring between the collar and the end face of the housing of the first valve is compressible at least equals the extent of movement of the tubular member between its first and second positions; this insures that the valve element of the first valve can engage its seat when the two housings are separated from each other.

The novel features which are considered as characteristic of the invention are set forth in particular in the appended claims. The improved connector itself, however, both as to its construction and the mode of operating the same, together with additional features and advantages thereof, will be best understood upon perusal of the following detailed description of a presently preferred embodiment with reference to the accompanying drawing.

BRIEF DESCRIPTION OF THE DRAWING

The single FIGURE is an axial sectional view of a quick-disconnect hose connector or coupling which embodies one form of the invention, the connector being shown in assembled condition in which its tubular member establishes communication between the passages of the valve housings.

DESCRIPTION OF THE PREFERRED EMBODIMENTS

The connector which is shown in the drawing constitutes a quick-disconnect hose coupling adapted to rapidly establish or terminate communication between a first flexible conduit or hose 1 and a second flexible conduit or hose 2. The connector comprises two halves I and II each of which includes or constitutes a tubular valve. The right hand half or valve I comprises a tubular valve body or housing 3 with an axially extending passage 3a having an open end which is remote from the conduit 1. The housing 3 is sealingly secured to the conduit 1 by a suitable fitting 1A whose construction forms no part of the invention. An annular valve seat 5 of the housing 3 surrounds an intermediate portion of the passage 3a and faces toward the conduit 1. That portion of the passage 3a which is disposed between the seat 5 and the fitting 1A contains a reciprocable valve element 6 and a helical valve spring 7 or analogous biasing means for urging the valve element 6 toward and into sealing engagement with the seat 5. In the illustrated embodiment, the right-hand end convolution of the spring 7 reacts against the housing 3 through the medium of an annular retainer 8 which abuts the fitting 1A (the latter is preferably threadedly connected to the housing 3). The leftmost convolution or convolutions of the spring 7 surround a smaller-diameter portion of the valve element 6 which has one or more grooves or notches 6a extending in parallelism with the axis of the passage 3a and permitting a fluid to flow from the interior of the conduit 1 toward the open end of the passage 3a or vice versa when the valve element 6 is lifted off the seat 5. The leftmost convolution of the spring 7 bears against an annular shoulder 6b of the valve element 6. The latter preferably consists of rubber or other elastically deformable material which is softer than the material of the housing 3 so that the valve element 6 is deformed when it bears against the seat 5 under the action of the spring 7.

The second half or valve II is similar to but not identical with the valve I. The valve II comprises a tubular housing or body 4 which is coupled to the adjacent end of the conduit 2 by a suitable fitting 2A and has as axially extending passage 4a with an open end remote from the conduit 2. The annular valve seat 5A of the valve II surrounds an intermediate portion of the passage 4a and faces toward the conduit 2. An elastically deformable valve element 6A (which is identical with the valve element 6) is biased against or toward the seat 5A by a helical valve spring 7A which reacts against the housing 4 through the medium of a retainer 8A.

The attaching means for separably coupling the housings 3 and 4 to each other in such positions that the passage 3a is coaxial with the passage 4a comprises a bayonet lock having a union nut 12 which is rotatable on the housing 4 and has one or more radially inwardly extending follower pins 13 which are received in helical cam grooves 3h (one shown) machined into the peripheral surface of the housing 3. One end of each groove 3h is open and the inclination and length of each groove may be such that the union nut 12 must complete a quarter turn, a half turn or a larger or smaller angular movement in order to attach the housing 4 to or to separate the housing 4 from the housing 3. The peripheries of the union nut 12 and housing 3 are preferably serrated, toothed or knurled (as at 12a and 3e) in order to enable the operator to properly grip these parts preparatory to establishment or termination of separable connection between the housings 3 and 4. During rotation of the union nut 12 relative to the housing 4 (while the follower pin or pins 13 extend into the groove or grooves 3h), the housing 4 moves axially toward or away from the housing 3 or vice versa.

The valve elements 6 and 6A are slidable along the surrounding internal surfaces of the housings 3 and 4. All of the heretofore described parts of the connector (preferably with the exception of elastically deformable valve elements 6 and 6A) may consist of suitable metallic material.

In accordance with a feature of the invention, the connector further comprises a tubular member 9 having a first end portion or actuating portion 9A, a second end portion or actuating portion 9B, and a third portion 9a which is a collar extending radially outwardly beyond the actuating portions 9A and 9B. The actuating portions 9A and 9B respectively extend into and are slidable in the portions 3b, 4b of the passages 3a, 4a, and the collar 9a is slidable in a larger diameter portion 3c at the open end of the passage 3a. A stop 11 (preferably a split ring which is received in a groove machined into the surface surrounding the larger-diameter portion 3c of the passage 3a) determines the extent of movement of the tubular member 9 from the illustrated (first) portion in which the actuating portions 9A, 9B respectively lift the valve elements 6, 6A off the respective seats 5, 5A to a second position which the tubular member 9 assumes when the housing 4 is detached or separated from the housing 3. The distance between the first and second positions of the tubular member 9 at least equals but preferably at least slightly exceeds the distance between the seat 5 and the valve element 6 when the valve I is open (as shown in the drawing). The stop 11 is located in the path of movement of the collar 9a. The tubular member 9 has an axial bore or channel 9c disposed between two transversely extending channels 9b in the free ends of the actuating portions 9A and 9B. The configuration of the channels 9b is such that the channel 9c communicates with the internal spaces of the conduits 1 and 2 (by way of the grooves 6a of the valve elements 6 and 6A) when the member 9 is held in the illustrated first position which this member assumes in automatic response to attachment of the housings 3 and 4 to each other. It will be noted that the grooves 6a of the valve elements 6, 6A communicate with the adjacent channels 9b in spite of the fact that the end faces of the actuating portions 9A, 9B abut the respective valve elements 6, 6A.

In accordance with a second feature of the invention, the connector further comprises sealing means which serves to prevent fluid flow from the atmosphere into the passages 3a, 4a (or vice versa) when the tubular member 9 assumes the illustrated position and which further prevents the flow of fluid from the atmosphere to the passages 3a, 4a (or vice versa) during attachment or separation of the housing 4 from the housing 3. The sealing means comprises two readily compressible elastic sealing rings 10 and 10A. The ring 10 surrounds the actuating portion 9A between the collar 9a and an internal shoulder or end face 3d of the housing 3, and the ring 10A surrounds the actuating portion 9B between the collar 9a and an end face 4d of the housing 4. The material of the rings 10, 10A may be highly compressible rubber or an elastic synthetic plastic material (e.g., Superlastex, trademark).

When the housings 3 and 4 are properly attached to each other, the thickness of the ring 10 may but need not equal the thickness of the ring 10A. The ring 10 is compressed because the collar 9a is remote from the stop 11 and the ring 10A is compressed by the end face 4d which extends well into the open end of the passage 3. When the housing 4 is detached from the housing 3, the ring 10A expands and remains in sealing engagement with the end face 4d at least until the spring 7A expands sufficiently to move the valve element 6A into sealing engagement with the seat 5A. Analogously, the ring 10 expands during movement of the collar 9a toward the stop 11 (under the action of the spring 7 and through the medium of the valve element 6) and seals the major part of the passage 3a from the atmosphere at least until the valve element 6 reaches and sealingly engages the seat 5. The ring 10A may be glued or otherwise bonded to the collar 9a or to the end face 4d. Each of the rings 10, 10A may consist of two or more neighboring rings.

When the housings 3 and 4 are to be connected to each other, the ring 10 is fully expanded and cooperates with the valve spring 7 to maintain the left-hand end face of the collar 9a in contact with the split ring or stop 11. The ring 10A is also fully expanded and extends into the interior of or even beyond the stop 11. The ring 10A undergoes compression as soon as it is engaged by the end face 4d of the housing 4, i.e., while the follower pin or pins 13 begin to enter the respective cam groove or grooves 3h. The actuating portions 9A and 9B thereupon engage the respective valve elements 6, 6A and move them away from the adjacent seats 5, 5A while the collar 9a moves away from the stop 11 toward the position which is shown in the drawing. The rings 10 and 10A undergo further compression and effectively seal the major portions of the passages 3a and 4a from the surrounding atmosphere, not only during attachment of the housing 4 to the housing 3 but also when the connector is operative to permit a fluid to flow from the conduit 1 into the conduit 2 or vice versa. The arrangement is such that the valve elements 6 and 6A move away from the respective seats 5 and 5A after the end face 4d of the housing 4 engages the ring 10A, i.e., after the passages 3a and 4a are effectively sealed from the atmosphere. The passage 3a is preferably sealed from the atmosphere at all times because the maximum thickness of the ring 10 is preferably such that this ring remains in sealing engagement with the end face 3d as well as with the collar 9a when the latter abuts the stop 11. The sealing action of the rings 10 and 10A is especially satisfactory when the connector is fully assembled. The ring 10 then engages the periphery of the actuating portion 9A, the collar 9a and the end face 3d. The ring 10A engages the periphery of the actuating portion 9B, the collar 9a and the end face 4d. It has been found that the improved connector effectively prevents leakage of any, or greatly reduces the leakage of, a gas which fills the interelectrode gap of an ionization chamber, not only when the connector is fully assembled but also during attachment or separation of the housing 4 from the housing 3, especially if the pressure of the gas is reduced prior to separation of the housings. Since the rings 10 and 10A are rather soft and sensitive, they should be shielded from full gas pressure which must be applied in the interelectrode gap of an ionization chamber. This is achieved by the housings 3, 4, actuating portions 9A, 9B and the collar 9a.

When the housings 3 and 4 are separated from each other, the valve elements 6. 6A automatically bear against the respective seats 5 and 5A because the valve springs 7 and 7A are free to expand. Furthermore, at least one of these valve elements is urged against the adjacent seat by pressurized fluid which fills the conduit 1 and/or 2. The deformability of valve elements 6 and 6A also contributes to satisfactory sealing action when the housings 3 and 4 are separated from each other. The material of these valve elements is preferably so soft that the entire end faces of the seats 5 and 5A can penetrate into the neighboring end faces of the respective valve elements.

The improved connector is susceptible of many modifications without departing from the spirit of the invention. For example, the sealing rings 10, 10A can be replaced with other types of sealing means and the collar 9a can be replaced with a differently configurated third portion of the tubular member. Also, the valve element 6 and/or 6A may be made of a rigid material if the respective seat consists of or is lined by a yieldable material. The connector may be equipped with a customary safety wire and the parts 3, 12 may be formed with external facets for convenient engagement by wrenches or other suitable tools. The bayonet lock can be replaced with other attaching means, e.g., by a simple threaded connection between the union nut 12 and housing 3. The valve elements 6, 6A may be replaced with spherical or otherwise configurated valve elements.

It is further clear that the improved connector can be used in rigid or flexible conduits for fluids other than high Z gases, that at least one of the valve housings may constitute an elbow, and that the union nut 12 may be omitted in its entirety if the housing 3 and/or 4 can turn on its fitting and one of the housings has threads or one or more bayonet pins which can be moved into direct engagement with threads or one or more cam grooves of the other housing.

Without further analysis, the foregoing will so fully reveal the gist of the present invention that others can, by applying current knowledge, readily adapt if for various applications without omitting features that, from the standpoint of prior art, fairly constitutes essential characteristics of the generic and specific aspects of my contribution to the art and, therefore, such adaptations should and are intended to be conprehended within the meaning and range of equivalence of the appended claims.

What is claimed is:

1. A connector for conduits, particularly a quick-disconnect coupling for hoses, comprising first and second valve housings each connected to a different conduit, said first and second housings respectively having first and second open-ended passages communicating with the interior of the respective conduits, first and second end faces remote from the respective conduits and first and second seats facing the respective conduits; first and second valve elements provided in the respective housings; first and second biasing means for urging said first and second valve elements against the respective seats; a tubular member installed in said first housing at the open end of said first passage and having first and second actuating portions and a third portion disposed between and extending radially beyond said actuating portions, said third portion being located intermediate said end faces when said housings are attached to each other and said tubular member being movable in said first housing between a first position in which said first actuating portion disengages said first valve element from the respective seat and a second position in which said first biasing means maintains said first valve element in sealing engagment with the respective seat; means for separably attaching said housings to each other in such positions that said second actuating portion extends through the open end of and into said second passage and disengages said second valve element from the respective seat whereby said second biasing means maintains said tubular member in said first position through the medium of said second valve element; a first elastic sealing ring surrounding said first actuating portion between said third portion and said first end face; and a second elastic sealing ring surrounding said second actuating portion between said third portion and said second end face, said sealing rings being compressible to an extent which at least equals the extent of movement of said tubular member between said first and second positions.

2. A connector as defined in claim 1, wherein said seats surround portions of the respectve passages inwardly of the open ends of such passages, said valve elements being disposed in said passages between the respective seats and the associated conduits.

3. A connector as defined in claim 1, wherein each of said biasing means comprises a spring which reacts against the respective housing and bears against the respective valve element.

4. A connector as defined in claim 1, wherein said third portion of said tubular member is a collar.

5. A connector as defined in claim 1, wherein said first passage has an enlarged portion at said open end thereof and said third portion of said tubular member is located in said enlarged portion, and further comprising stop means provided in said first housing and abutting against said third portion in said second position of said tubular member.

6. A connector as defined in claim 5, wherein said stop means is a split ring in said enlarged portion of said first passage.

7. A connector as defined in claim 1, wherein said valve elements consist of deformable material.

8. A connector as defined in claim 7, wherein said seats consist of a material which is harder than the material of said valve elements so that said seats deform said valve elements when said biasing means are free to maintain said valve elements in engagement with the respective seats.

9. A connector as defined in claim 1, wherein said attaching means comprises a bayonet lock.

10. A connector as defined in claim 9, wherein said bayonet lock comprises a union nut rotatably mounted on one of said housings and having an inwardly extending follower, the other of said housings having a helical cam groove for said follower.

11. A connector as defined in claim 1, wherein said passages are coaxial with each other when said attaching means couples said housings to each other.

12. A connector as defined in claim 1, wherein said tubular member has a bore which communicates with said passages in the first position of said member.

* * * * *